(12) United States Patent
Dippel

(10) Patent No.: US 7,044,849 B2
(45) Date of Patent: May 16, 2006

(54) AIR VENT FOR VENTILATION SYSTEMS

(75) Inventor: Thomas Dippel, Neuhemsbach (DE)

(73) Assignee: TRW Automotive Electronics & Components GmbH & Co. KG, Enkenbach-Alsenborn (DE)

( * ) Notice: Subject to any disclaimer, the term of this patent is extended or adjusted under 35 U.S.C. 154(b) by 0 days.

(21) Appl. No.: 10/388,790

(22) Filed: Mar. 14, 2003

(65) Prior Publication Data

US 2004/0063397 A1    Apr. 1, 2004

(30) Foreign Application Priority Data

Mar. 15, 2002 (DE) .......................... 202 04 189 U

(51) Int. Cl.
*B60H 1/26* (2006.01)

(52) U.S. Cl. ........................ 454/143; 454/69

(58) Field of Classification Search ............... 454/152, 454/69, 143, 154, 286
See application file for complete search history.

(56) References Cited

U.S. PATENT DOCUMENTS

| | | | | |
|---|---|---|---|---|
| 1,340,673 A * | 5/1920 | Roe | ............................... | 49/39 |
| 1,926,795 A * | 9/1933 | Sassenberg | .................. | 454/286 |
| 2,755,729 A * | 7/1956 | Galbraith et al. | ............ | 454/154 |
| 3,319,560 A * | 5/1967 | Schaaf | ........................ | 454/154 |
| 3,835,759 A * | 9/1974 | Llyod | ......................... | 454/154 |
| 4,092,907 A * | 6/1978 | Meyer et al. | ................ | 454/154 |
| 4,915,021 A | 4/1990 | Soethout | | |
| 5,399,120 A * | 3/1995 | Burns et al. | ................. | 454/126 |
| 5,588,910 A * | 12/1996 | Hutter et al. | ................ | 454/154 |
| 5,733,189 A * | 3/1998 | Eastwood | ..................... | 454/155 |
| 5,746,651 A * | 5/1998 | Arajs et al. | .................. | 454/154 |
| 5,921,860 A * | 7/1999 | Marsden | ...................... | 454/155 |
| 6,113,483 A * | 9/2000 | Schambre et al. | ........... | 454/121 |
| 6,342,003 B1 * | 1/2002 | Wang | .......................... | 454/155 |
| 6,364,760 B1 | 4/2002 | Rooney | | |
| 6,616,523 B1 * | 9/2003 | Tani et al. | .................... | 454/137 |
| 6,645,065 B1 * | 11/2003 | Rooney et al. | ............. | 454/154 |
| 6,736,341 B1 * | 5/2004 | Lind | ........................ | 239/587.1 |

FOREIGN PATENT DOCUMENTS

| | | |
|---|---|---|
| DE | 3044289 | 6/1982 |
| DE | 3927217 | 8/1990 |
| DE | 19605199 | 2/1997 |
| EP | 0719665 | 7/1996 |
| EP | 0879718 | 11/1998 |
| EP | 1033269 | 9/2000 |
| GB | 768139 | 2/1957 |

* cited by examiner

*Primary Examiner*—Derek S. Boles
(74) *Attorney, Agent, or Firm*—Tarolli, Sundheim, Covell & Tummino L.L.P.

(57) ABSTRACT

An air vent is provided that is capable of delivering a distributed divergent air flow with a predominant direction of flow that can be changed within a wide range of mutually perpendicular directions. In one embodiment, the air vent has an outlet grid that is generally ball shaped and that is rotatably mounted at an end of an air duct for rotation about its center. Each of the multiple outlet openings of the grid points to a direction that is different from pointing directions of all other outlet openings so that a divergent air flow is obtained. By rotating the ball shaped grid about its center, the predominant direction of air flow can nevertheless be changed in a within a wide range.

6 Claims, 7 Drawing Sheets

AIR VENT FOR VENTILATION SYSTEMS

The present invention relates to an air vent for ventilation systems, especially in vehicles.

Conventional air vents in vehicles have an outlet opening with a set of parallel lamellas that are jointly pivoted to deflect an air flow. When an air flow is to be deflected both horizontally and vertically, a second set of lamellas is provided upstream from a first set, and the first and second sets of lamellas are pivoted about mutually perpendicular axes. With an air vent of this configuration, an air flow can be deflected in a wide range between "up" and "down" and between "left" and "right", but always remains a directed flow, causing turbulence and local zones of high air flow velocities within the vehicle cabin whereas little movement of air occurs in other regions.

The present invention provides an air vent that is capable of delivering a distributed divergent air flow with a predominant direction of flow that can be changed within a wide range of mutually perpendicular directions.

In a first embodiment of the invention, the air vent has an outlet grid that is generally ball shaped and that is rotatably mounted at an end of an air duct for rotation about its center. Each of the multiple outlet openings of the grid points to a direction that is different from pointing directions of all other outlet openings so that a divergent air flow is obtained. By rotating the ball shaped grid about its center, the predominant direction of air flow can nevertheless be changed in a within a wide range.

In a second embodiment of the invention, the air vent has an outlet grid formed of a plurality of parallel grid vanes the ends of which are pivotally mounted at the outlet end of an air duct. Each grid vane has multiple air escape openings. The grid vanes can be pivoted between a condition where they together form a substantially continuous grid surface, providing a distributed or divergent air flow, and multiple conditions where they define parallel air escape slots and act as lamellas to provide a directed air flow.

In a third embodiment of the invention, an air vent device is comprised of a cylindrical duct member that has a first end connected to an air duct, a second end closed by a wall and a circumferential wall that forms an air outlet grid. Multiple air escape openings of the grid point into different directions, delivering a distributed or divergent flow of air. Preferably, movable air deflection flaps are mounted within the cylindrical duct member so that a predominant orientation of air flow can be adjusted.

Three different embodiments of the air vent are shown in the accompanying drawings and are defined in the following claims.

Further features and advantages of the invention will become apparent from the following description of preferred embodiments with reference to the appending drawings. In the drawings:

FIG. 4 is an exploded view of the air vent in FIG. 1;

Figure 1:
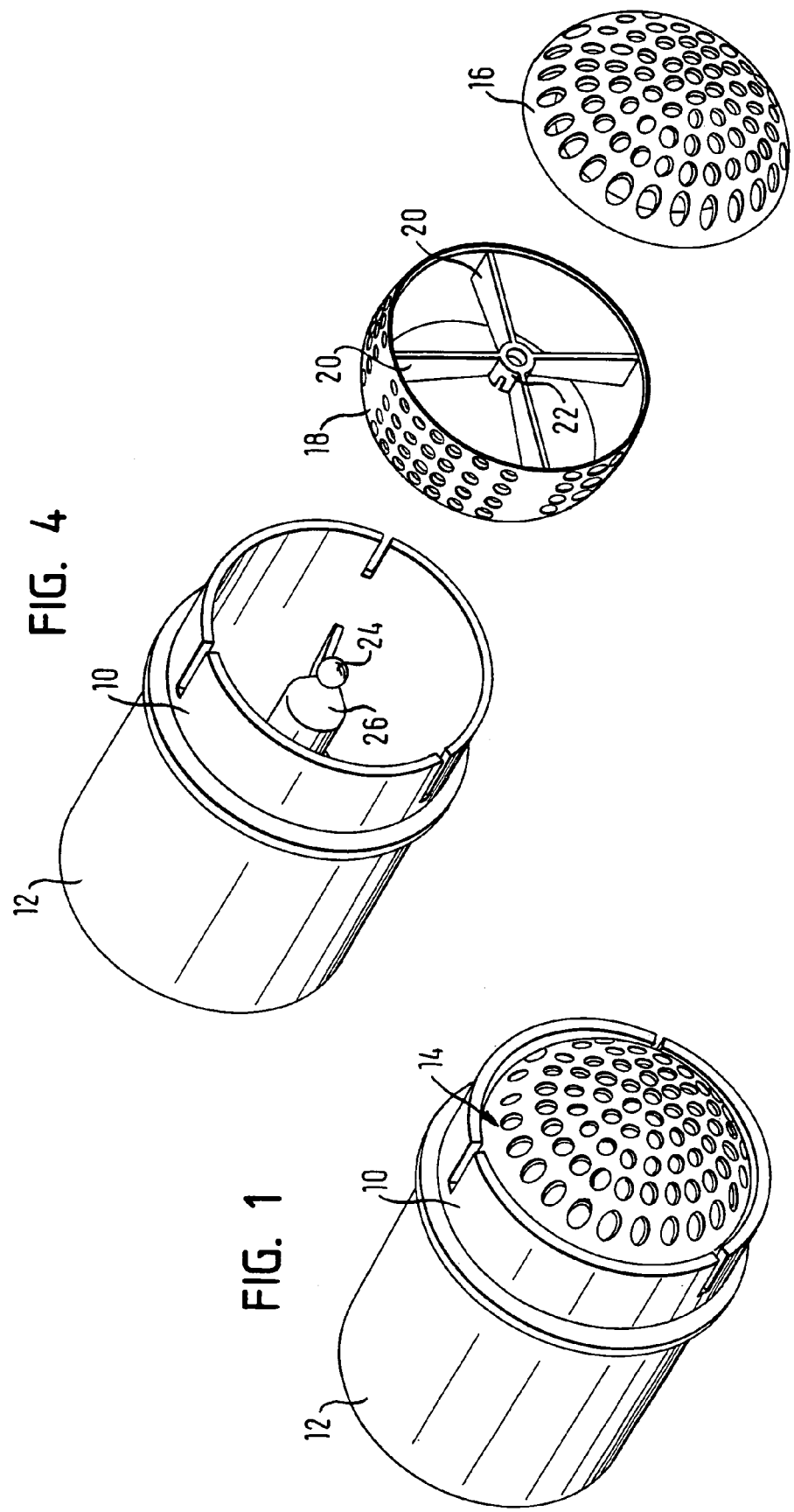
FIG. 1 is a perspective view of an air vent with a ball shaped grid that can be rotated about its center.

An air vent as shown in FIGS. 1 to 4 has a cylindrical tube section 10 with one end connected to an end of an air duct 12 and another end fitted with an outlet grid 14. Outlet grid 14 is generally ball shaped and is assembled of a substantially semispherical shell member 16 and an annular support member 18. Support member 18 has an outer surface spherically curved to a radius identical with that of shell member 16 so that shell member 16 and support member 18 together form a ball portion which is about 60 to 80 percent of a total 360° ball.

Figure 2:
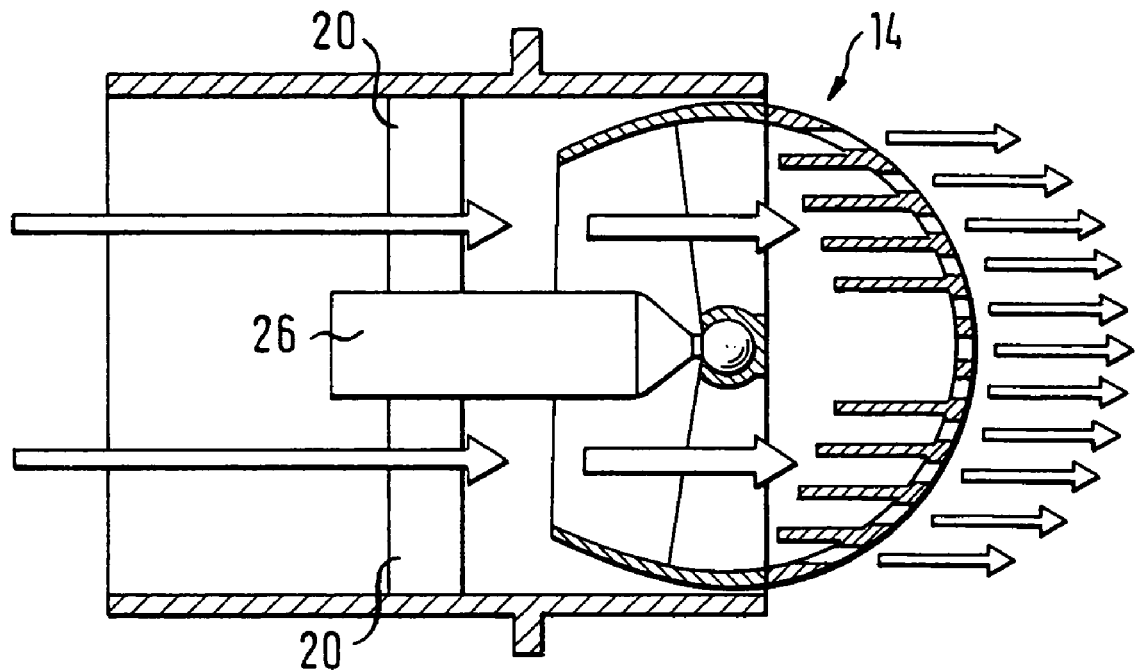
FIG. 2 is a sectional view of an air duct end with the ball shaped grid in a first position.
Figure 3:
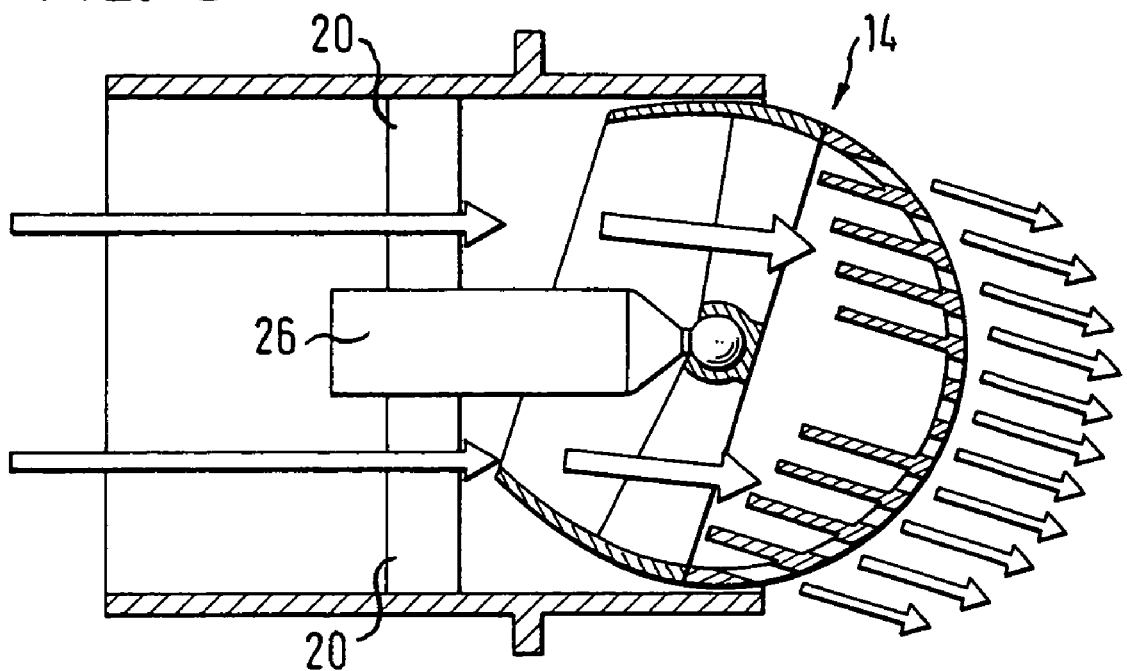
FIG. 3 is a sectional view of an air duct end with the ball shaped grid in a second position.

Support member 16 and shell member 18 each have multiple outlet openings each of which forms a minute air escape nozzle. Each of these multiple air escape nozzles may point into a different direction so that, as a whole, outlet grid 14 acts to provide a distributed or divergent flow of air from an air stream supplied through air duct 12. Alternatively, as illustrated in FIGS. 2 and 3, these nozzles may all point into the same direction to provide a rather directed air flow.

Support member 18 has four integrally molded baffle elements 20 that extend radially and are spaced circumferentially at 90° from each other. Baffle elements 20 have radially inner ends joined by a hub member 22. Hub member 22 is pivotally mounted on a ball member 24 carried on a free end of an axially extending grid carrier stud 26. As seen in FIGS. 2 and 3, grid carrier stud 26 is coaxial with air duct 12 and is mounted therein with radial strut members 28.

By virtue of pivotally mounting support member 18 on grid carrier stud 26, outlet grid 14 may be rotated in any direction about its center, as materialized by ball member 24. Accordingly, and as understood by contemplating FIGS. 2 and 3, an air flow supplied by the air vent, whether directed or divergent, may be easily oriented in space by simply rotating outlet grid 14, manually or by means of a convenient adjustment mechanism (not shown).

Figure 5:
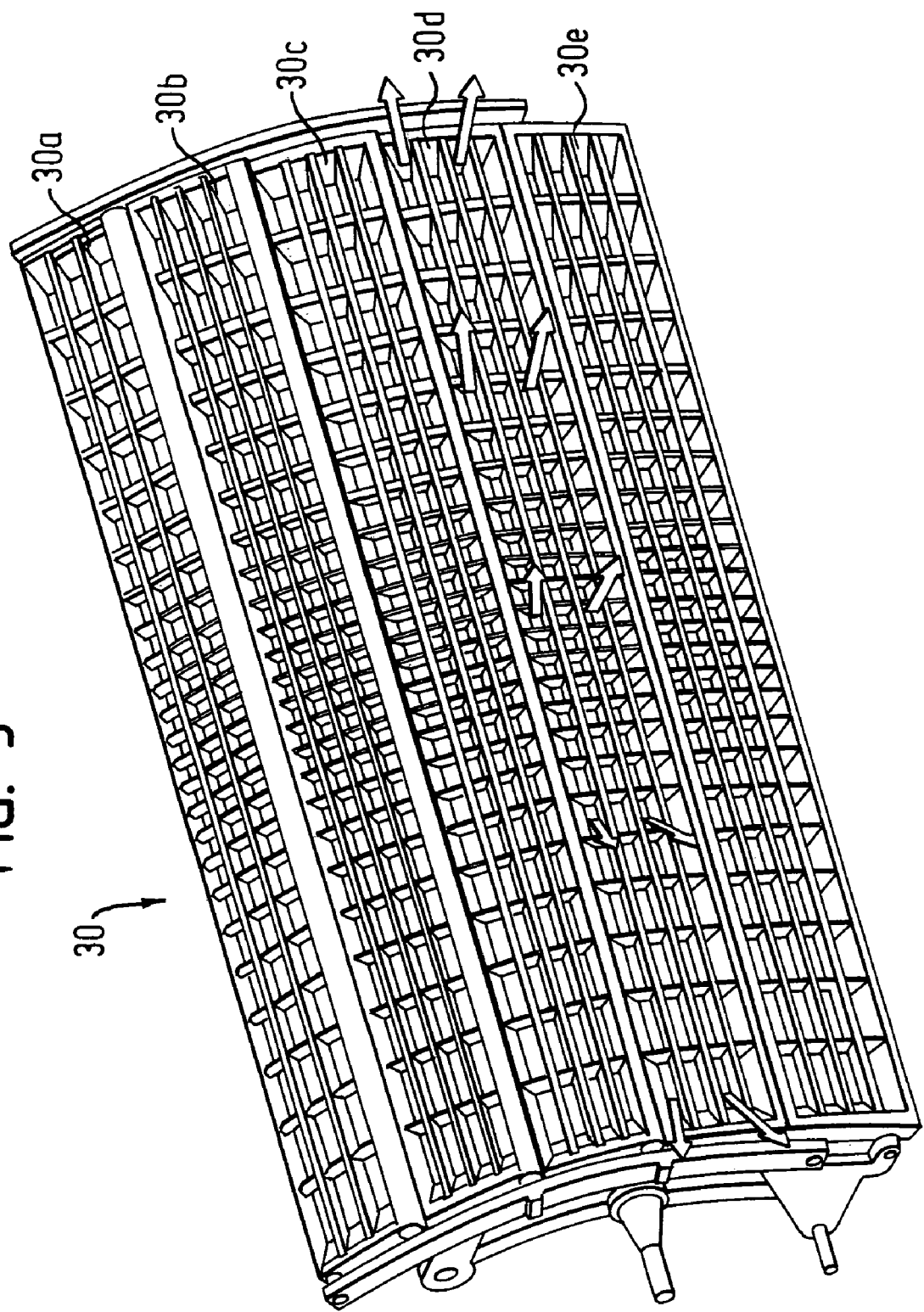
FIG. 5 is a perspective view of an air vent with an outlet grid formed of a plurality of parallel pivotal grid vanes.
Figure 7:
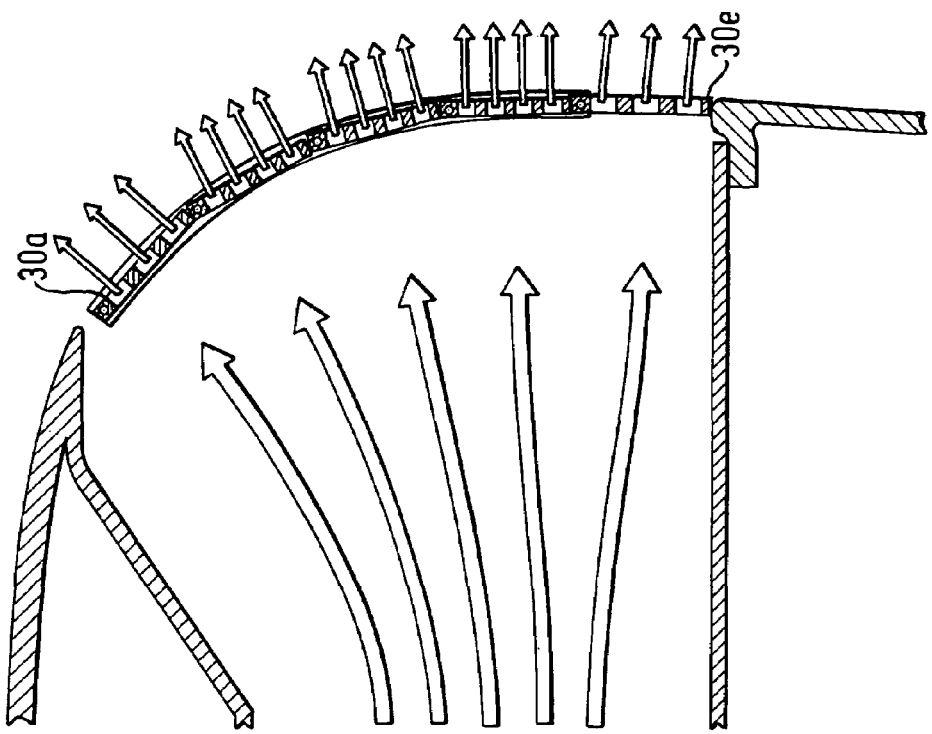
FIGS. 6 and 7 illustrate a distributed air flow delivered by the air vent of FIG. 6.
Figure 6:
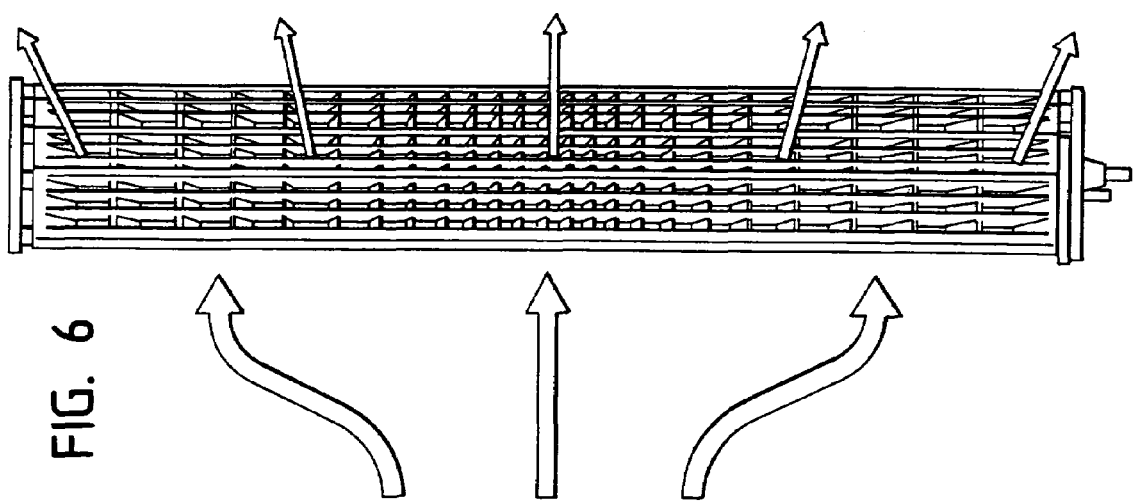

Turning now to the embodiment shown in FIGS. 5 to 11, an air vent has an outlet grid, generally designated at 30, composed of five parallel grid vanes 30a, 30b, 30c, 30d and 30e. Each of these grid vanes is pivotally mounted in a frame (not shown). The pivot axes of grid vanes 30a to 30e are parallel and spaced from each other so that, in a condition shown in FIGS. 5, 6 and 7, they jointly assume parallel pivotal positions where they together form a substantially continuous grid surface. Each grid vane has multiple air escape openings that widen horizontally from the center to both lateral ends, as seen in FIG. 5, thereby providing a horizontally distributed air flow. Generally, each air escape opening is a nozzle defined by air deflection surfaces oriented in a way determined by a particular design.

Figure 9:
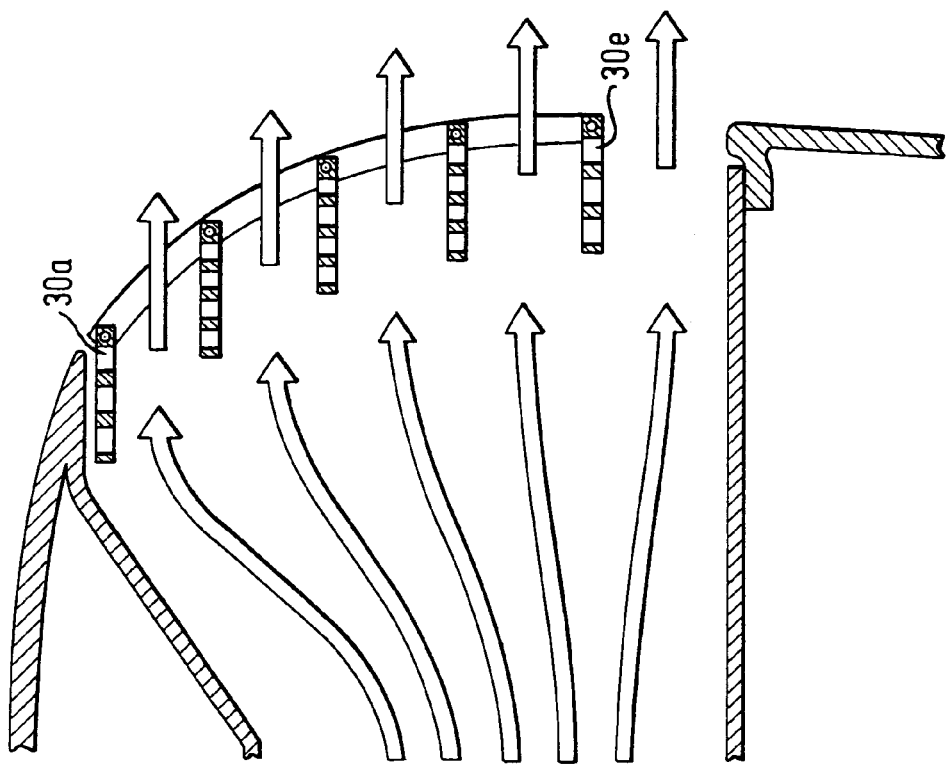
FIGS. 8 and 9 illustrate a directed air flow delivered by the air vent of FIG. 6.
Figure 8:
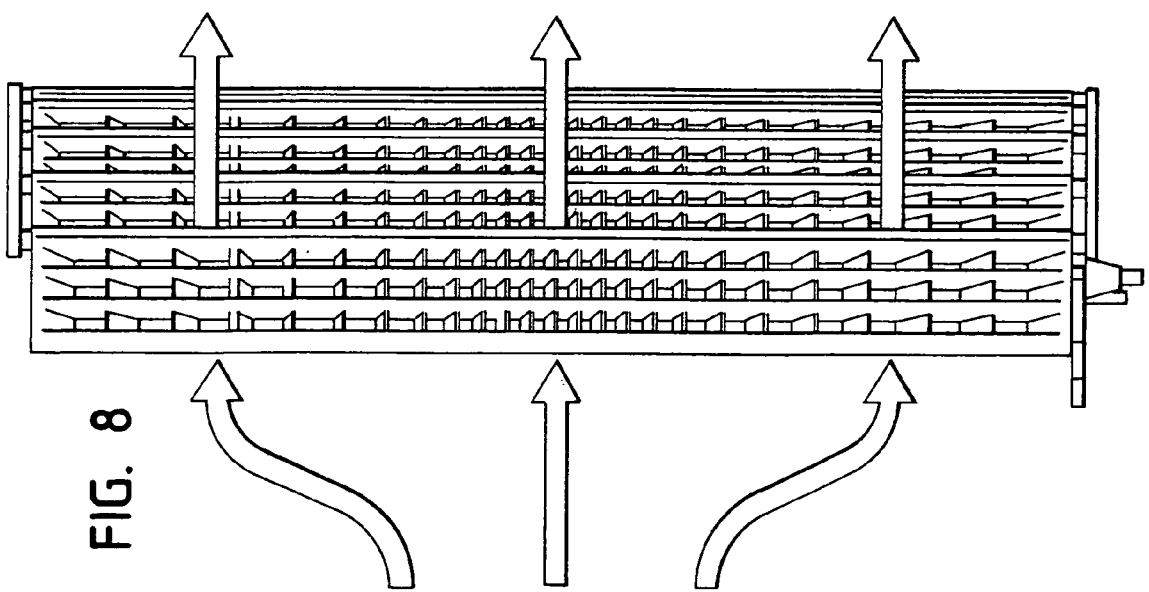

In a pivotal condition shown in FIGS. 8 and 9, grid vanes 30a to 30e are substantially horizontally aligned to define five parallel air escape slits as illustrated. In this condition, the air vent supplies a rather directed flow of air.

Figure 10:
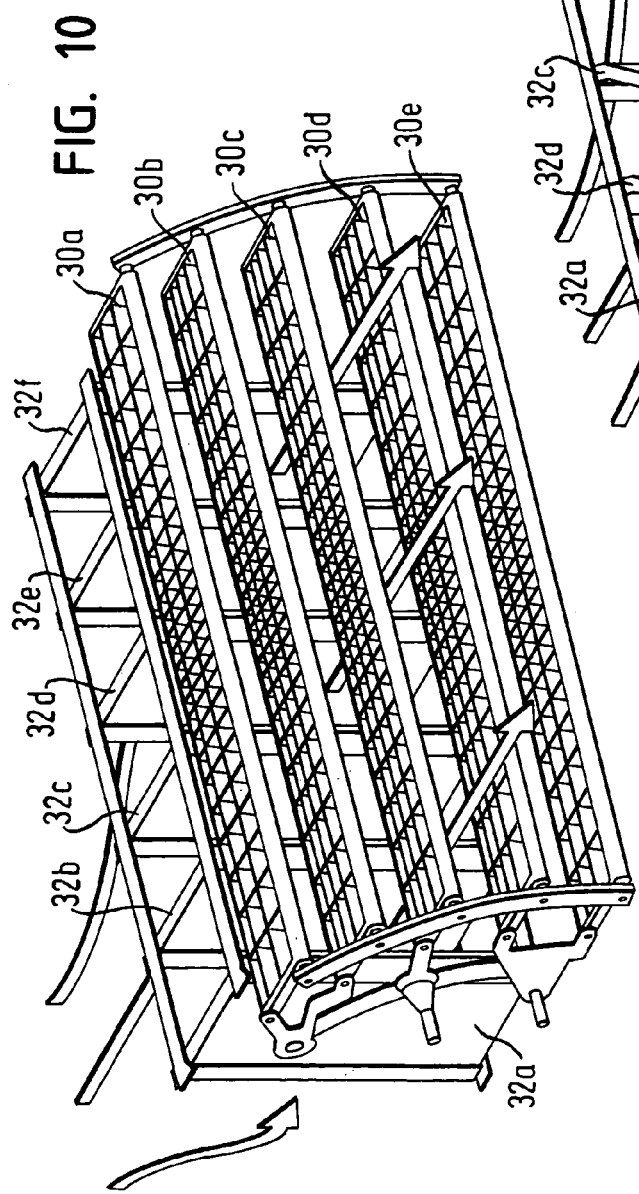
FIG. 10 is a perspective view of an embodiment generally similar to that in FIG. 6, but having a set of air deflection baffles upstream from the grid vanes.
Figure 11:
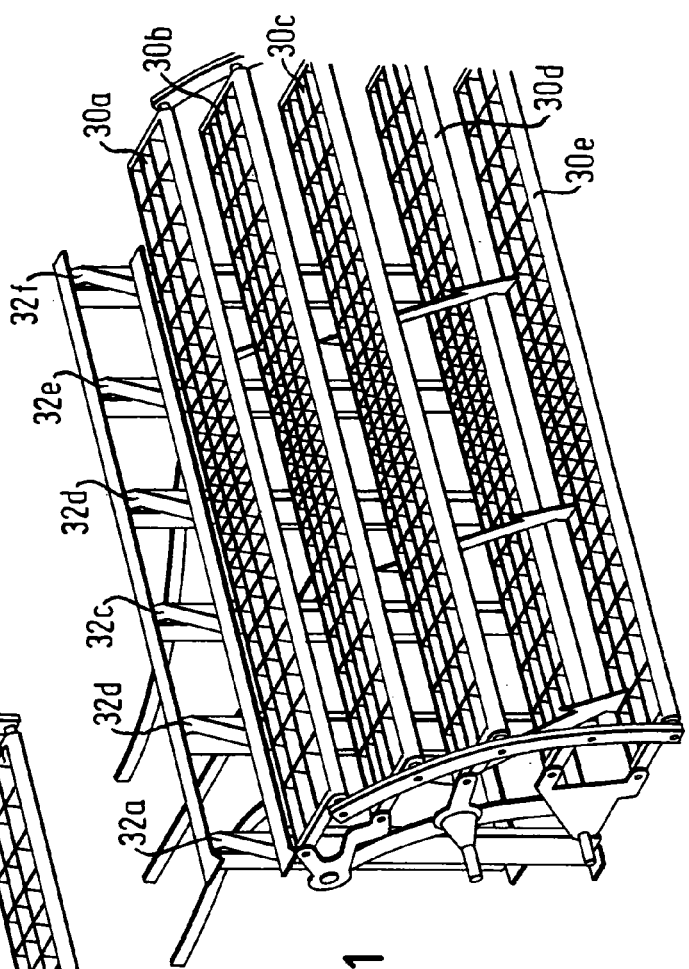
FIG. 11 is a view similar to that in FIG. 11, but showing the deflection baffles in a pivoted position.

With reference to FIGS. 10 and 11, a set of baffle members is provided upstream of outlet grid 30. Specifically, six parallel and vertically extending baffle members 32a to 32f are arranged upstream of outlet grid 30. Each baffle member 32a to 32f is mounted pivotally on a vertical axis. By jointly pivoting baffle members 32a to 32f, an air flow delivered by the air vent can be given a predominant orientation, whether directed or divergent.

Figure 14:
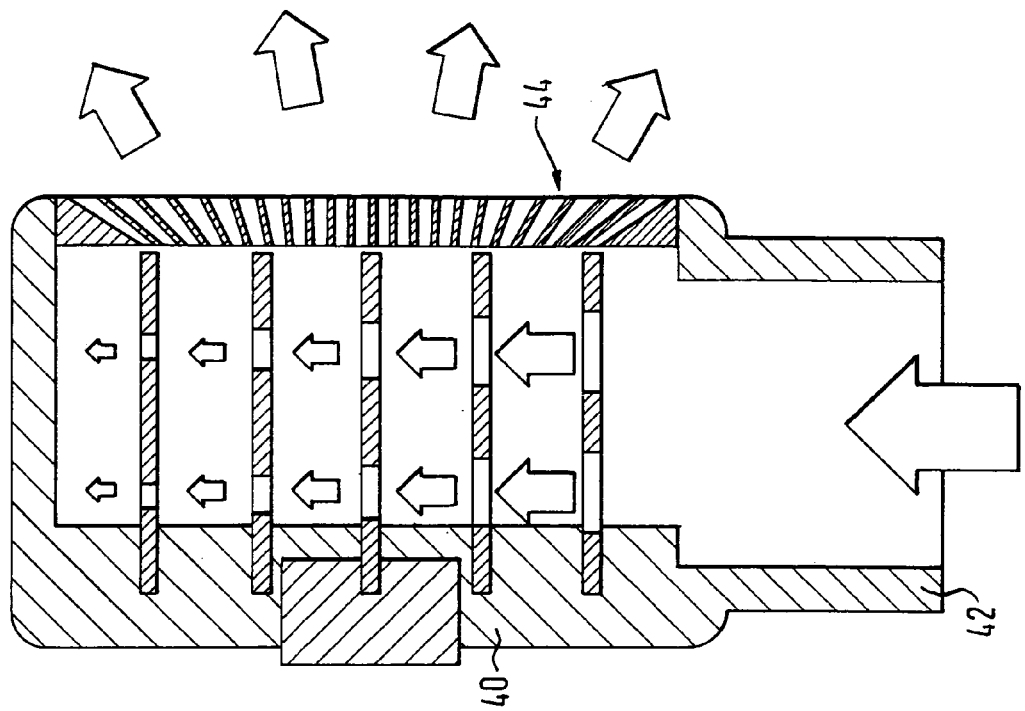
FIG. 14 is a schematic axial section of the duct member.
Figure 12:
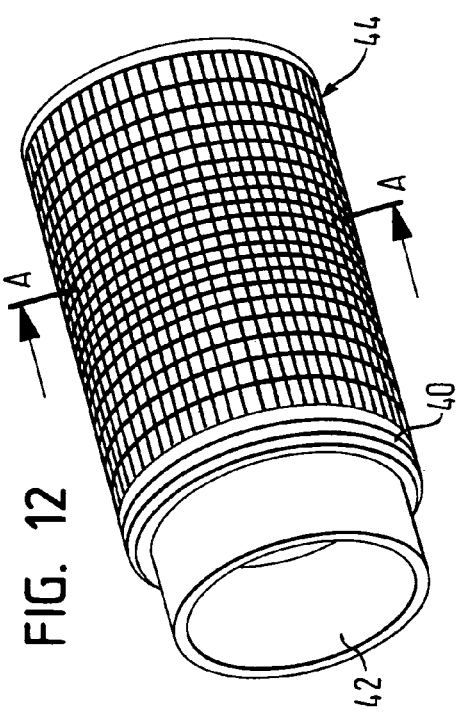
FIG. 12 is a perspective view of an air vent with a cylindrical duct member.
Figure 13:
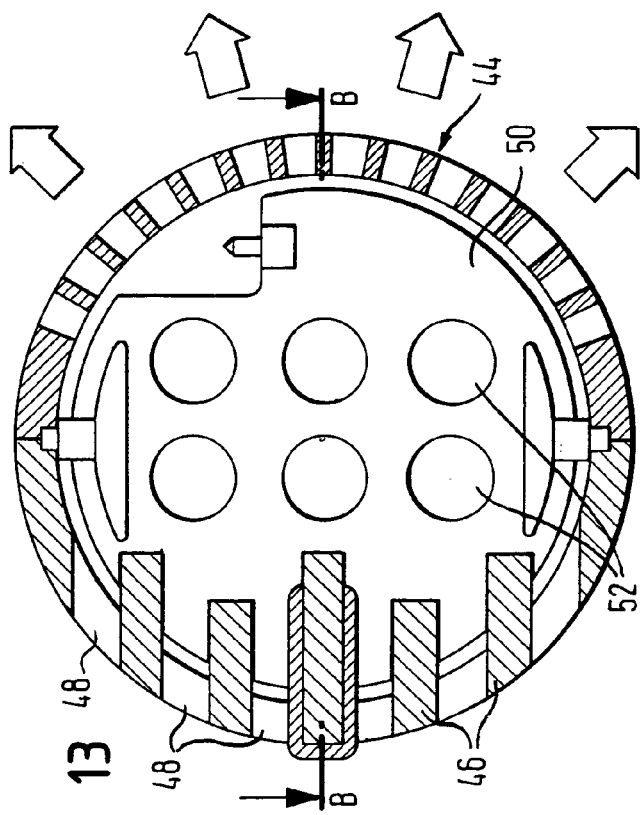
FIG. 13 is a schematic radial section of the duct member.

With reference now to FIGS. 12 to 14, an embodiment of an air vent is shown wherein a cylindrical duct member 40 has a first end connected to a sleeve 42 for connection to an air duct and a second end closed by a wall. A circumferential envelope area of duct member 40 is formed as an outlet grid 44 with multiple outlet openings. As seen in FIG. 14, each outlet opening is defined by directive wall sections and acts as a nozzle. As these outlet openings are all located in a cylindrically curved wall section, adjacent openings in a circumferential direction point to different directions so that the outlet grid delivers a divergent flow of air. In addition, outlet openings close to either axial end of the outlet grid are inclined away from an imaginary radial plane located midway between the axial ends of the outlet grid, the angle of inclination being the greater the closer an outlet opening is to an axial end of the outlet grid. As a result, the air flow delivered by the air vent through outlet grid 44 is divergent both in a radial plane and in an axial plane of the duct member 40, as illustrated by arrows in FIGS. 13 and 14.

An envelope wall section opposite outlet grid 44 is provided with parallel elongate outlet slots 46 separated by webs 48 which extend in the axial direction of duct member 40. Pivotally mounted inside of duct member 40 are generally circular baffle plates 50. Each baffle plate 50 is mounted on an axis that extends diametrically of duct member 40, and all baffle plates are linked for joint pivotal movement between a radial position as seen in FIG. 14 and any of a wide range of pivotal positions inclined to either side of the radial position. Baffle plates 50 are provided with through holes 52 that allow an axial passage of air flow within duct member 40 in spite of the radial extension of baffle plates 50. As seen in FIG. 14, through holes 52 are the wider the closer the corresponding baffle plate 50 is to connection sleeve 42.

On the side of outlet slots 46, the air vent delivers a directed flow of air, the direction of which is adjusted by jointly pivoting baffle plates 50. On the side of outlet grid 44, although a divergent flow of air is supplied, a predominant direction of air flow is be obtained by adjusting baffle plates 50 to any pivotal position different from the radial position shown in FIG. 14.

In addition, the air vent as a whole can be rotated about the axis of duct member 40 if connection sleeve 42 is received in an end of an air duct with a sliding fit that permits rotation, so that the air vent can deliver either of a directed or a divergent flow of air in any direction.

The invention claimed is:

1. An air vent for a ventilation system in a vehicle, comprising an outlet grid having multiple outlet openings, wherein said outlet grid is generally ball shaped, and further comprising a hub member which is provided inside said outlet grid for pivotally mounting said outlet grid on a ball member that is mounted at an end of an air duct.

2. The air vent of claim 1, wherein each of said outlet openings points to a direction that is different from pointing directions of all other outlet openings in a manner to provide a divergent air flow.

3. The air vent of claim 1, wherein each of said outlet openings points to substantially the same direction in a manner to provide a directed air flow.

4. The air vent according to claim 1, wherein movable baffle elements are placed upstream of said outlet openings.

5. The air vent according to claim 1, wherein said outlet grid is assembled from a substantially semi-spherical shell member and an annular support member.

6. The air vent according to claim 4, wherein said baffle elements are integrally molded with a support member.

* * * * *